United States Patent Office 2,790,758
Patented Apr. 30, 1957

2,790,758

PROCESS FOR THE PRODUCTION OF ESTERS OF ALLYL-BROMINATED OLEFINIC ALCOHOLS

Hermann Schaltegger, Flamatt, Bern, Switzerland

No Drawing. Application August 11, 1954,
Serial No. 449,270

13 Claims. (Cl. 204—158)

The present invention relates to a process for the preparation of esters of olefinic alcohols brominated in α-position to the olefinic double bond.

In my United States patent application Serial No. 114,691, filed September 8, 1949, now Patent No. 2,647,867, and in my copending application Serial No. 220,344, filed April 10, 1951, now abandoned, it has been proposed to introduce free bromine in the α-position to an olefinic double bond of certain types of organic compounds at low or relatively moderate temperatures.

It has now surprisingly been found that it is also possible to prepare in a corresponding manner esters of unsaturated alcohols brominated in α-position to a double bond thereof. Such bromination has proved possible not only for the esters of acyclic but also for those of cyclic unsaturated alcohols. The use of the esters instead of the free alcohols is necessary because the free hydroxyl group of alcohols would be disturbing in said brominating reaction. The simple carboxylic acids, such as acetic acid, are best suited for this purpose.

It is therefore, an object of the present invention to produce esters of unsaturated alcohols brominated in α-position to the double bond.

It is another object of this invention to produce esters of unsaturated alcohols brominated in α-position to the double bond by direct reaction of the start materials with free bromine.

And it is a further object of this invention to effect direct bromination of esters of unsaturated alcohols in α-position to the double bond at relatively low or moderate temperature.

Other objects and advantages of this invention will become apparent from the following specification and the annexed claims.

With these and other objects in view, the process in accordance with my present invention essentially is as follows:

Esters of unsaturated alcohols are dissolved in non-polar solvents indifferent against halogen. The choice of solvents useful for this purpose is not very great, and from a practical point of view carbon tetrachloride and carbon disulfide are those which are here to be considered. The other non-polar solvents indifferent against halogen either have boiling points which are by far too low for their use in technically carrying out the present process in a simple manner, or their boiling points are so high (over 100° C.) that secondary decompositions of the bromine compounds formed in the process may occur if their solutions in such solvents are heated to boiling at ordinary pressure.

A temperature in the range of about 40° to 80° C. is recommendable in the carrying out of the bromination according to the present process.

It is of considerable importance for obtaining good results that dilute solutions of the substances to be brominated are used. Highly dilute solutions of not more than about 3% content, preferably 0.5-3%, are employed best. The bromine, too, is preferably used in dilute state, either in the form of a solution in an indifferent solvent or in mixture with an indifferent gas.

Further-on it is advantageous to add the dilute bromine only gradually to the solution of the esterified unsaturated alcohol. This gradual addition is preferably carried out by means of inlet pipes the openings of which are deeply immersed into said solution under treatment so that said dilute bromine is quickly spread or divided within the reaction solution. Additionally, this solution may be stirred for still better and intimately mixing the reactants.

The construction of the apparatus to be used for carrying out the process may vary in many respects, particularly according to the details of carrying out the process. For example, the bromine may be added to the reaction solution in vapor form mixed with an inert gas, such as nitrogen. It is possible during the reaction to heat the reaction liquid to boiling under reflux or, still better, to distill under lightly diminished pressure during the reaction part of the solvent together with the hydrobromic acid forming.

During the entire reaction, the reaction vessel has to be irradiated, because otherwise saturated dibromo derivatives are formed instead of the unsaturated allyl brominated compounds desired. Any type of light sources of the commerce, or else, may be employed for this purpose, such as glow lamps, fluorescent lamps, quarts lamps, and so on.

The reaction time or period of the bromine addition to the ester solution has practically proved to be best between about 40 to 80 minutes. It would theoretically be more advantageous to add the bromine still more slowly. However, the esters of the allyl brominated alcohols to be produced are very sensitive to temperature and decompose after some time already at about 80° C. and, for this reason, the reaction time must not be too long if an optimum of unsaturated allylic brominated compound is to be obtained.

Of the bromination products obtained, only those of simple structure and of comparatively low molecular weight can be distilled in vacuo without decomposition. For approximately determining the yield, the hydrobromic acid formed during the bromination was titrated. According to the equation of the reaction, one mol of hydrobromic acid is to be formed per mol of allylic bromined. The number of hydrobromic acid mols thus indicates the so-called degree of the substitution.

The following reactions may yet be named as additional proof for the presence of bromine in the allylic position: A precipitation of silver bromide is immediately formed by addition of an alcoholic solution of silver nitrate. This reaction is not obtained with normal alkyl bromides. Only a slight cloudiness is to be observed in this case, as is well known, after boiling the solution for a long time with a solution of silver nitrate. Finally, it is possible to add bromine under irradiation to the unsaturated allylic monobromic product dissolved in ether or acetic acid, whereby a saturated tribromo alcohol is obtained and may be separated, showing that a double linkage was present in the originally produced allylic bromide.

My present process makes it possible to produce a very large number of esters of different unsaturated alcohols brominated in the allyl-position. Generally spoken esters of all such unsaturated alcohols may be brominated in the allyl-position which contain at least one

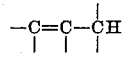

group in their molecule. Some examples of such alcohols are: crotyl or crotonyl alcohol, 2-pentenol (γ-ethylallyl alcohol), methyl-propenylcarbinol, 3-hexenol, isopropylisocrotyl-carbinol, 2-decene-7-ol, linalool, citronellol, farnesol, oleyl alcohol, phenylcrotyl, alcohol, terpinol, pulegol verbenol, and so on. All these alcohols are best used in the form of their acetates.

*Example 1*

11.4 g. of crotonyl acetate boiling at 126–128° C. under a pressure of 715 mm. Hg are dissolved in 800 cc. of carbon tetrachloride in a cylindrical glass vessel of a capacity of about 2 liters and a diameter of about 10–12 cc. The cover is provided with a passage for a stirrer, two calibrated dropping cylinders of 200 cc., each, and a genuflected outlet pipe connected with a descending condenser. The glass vessel is uniformly irradiated at all sides by four 200-watt lamps. The inlet pipes for the bromine immerse into the solution and end near the bottom of the vessel. It is suitable to make use of inlet pipes perforated like a fine sieve in order to obtain good distribution of the bromine. The recipient of the condenser is connected with a suction pump of the type working by streaming water, whereby the distillation velocity can be regulated by control of the sub-pressure.

The carbon tetrachloride solution is heated to boiling, and 16 g. of bromine dissolved in 400 cc. of carbon tetrachloride are allowed to drop into said boiling solution from the two dropping cylinders in such a degree that 50 minutes will be required to introduce the entire amount of said bromine solution. Stirring is performed during the bromination, and the velocity of the distilling-off is regulated so that just the same amount of solvent is distilled off as is added by the bromine solution. The hydrogen bromide formed in the bromination is removed with said solvent. After the above named period of time, the remaining carbon tetrachloride is distilled off in vacuo, and 20 g. of brominated crotonyl acetate are obtained. A sudden precipitation of silver bromide is formed by addition of an alcoholic silver nitrate solution to a sample of the resulting product. The bromocrotonyl acetate is somewhat fuming in the air. The bromine content of said compound corresponds to that of a monobromide.

*Example 2*

32 g. of oleyl acetate are dissolved in 1200 cc. of carbon tetrachloride and the solution is uniformly irradiated by four 22-watt lamps. The reaction vessel is provided with a distributer for gas (porous glass pipe, glass-frit, or the like), a descending condenser, and a stirrer. The solution is heated to gentle boiling while stirring, and a mixture of about 10 parts by volume of bromine and about 200 parts by volume of nitrogen is then gradually introduced into the slightly boiling solution within 55 minutes. The vapor pressure of the bromine-gas generator is regulated so (for example by putting it into iced water) that 16.1 g. of bromine are introduced during said period into the solution to be brominated. The hydrogen bromide forming in this bromination is continuously driven off during the entire treatment together with evaporating carbon tetrachloride. The introduction of the bromine-nitrogen mixture and the distilling-off of solvent are to be tuned with respect to each other in such a manner that no unused bromine will distil off with the solvent. This can easily be achieved by a suitable arrangement of the gas-inlet pipe and suitable regulation of the distilling velocity of the carbon tetrachloride. After finishing the bromination, the carbon tetrachloride still present is evaporated in vacuo. The residue is a yellowish oil which somewhat fumes at the air and shows a bromine content of 19.4% (calculated for the monobromide is 20.5%). A precipitation is formed at once by silver nitrate.

*Examples 3–6*

| Worked as in Example | Acetate used of | Acetate (g.) in Solvent (cc.) | Bromine (g.) in Solvent (cc.) | Period of Irradiation | Yield in Monobromo-olefinic Alcohol or Degree of Substitutions, percent |
|---|---|---|---|---|---|
| 1 | oleyl alcohol | 16/900 $CCl_4$ | 8.1/500 $CCl_4$ | 52′ | 76 |
| 1 | citronellol | 20/1,000 $CS_2$ | 16/700 $CS_2$ | 45′ | 51 |
| 2 | geraniol | 20/1,000 $CCl_4$ | 16 $Br_2$:$N_2$=1:20 | 55′ | 48 |
| 1 | terpinol | 19.7/1,200 $CCl_4$ | 16/200 $CCl_4$ | 40′ | 64 |

Numerous modifications and variations of the process described may be devised without departing from the principles and the true spirit of the invention, and no other limits should be imposed thereon than are indicated in the annexed claims.

This application is a continuation-in-part of my co-pending application, Serial No. 220,344, filed April 10, 1951, now abandoned.

What I claim is:

1. A process for the production of esters of olefinic alcohols selected from the group consisting of acyclic and monocyclic olefinic alcohols brominated in α-position to the olefinic double bond comprising treating dilute solutions containing not more than 2% of esters of olefinic alcohols having at least one double bond in the molecule and selected from the group consisting of acyclic and monocyclic olefinic alcohols with free bromine while irradiating the reaction mixture with light, and separating the resulting olefinic bromo-esters by evaporation of the solvent employed.

2. A process in accordance with claim 1, wherein the bromine, too, is employed in a dilute state.

3. A process in accordance with claim 2, wherein the bromine is dissolved in the same type of solvent as the material under treatment.

4. A process in accordance with claim 2, wherein the bromine is diluted by an indifferent gas.

5. A process in accordance with claim 4, wherein the inert gas is nitrogen.

6. A process in accordance with claim 1, wherein a relatievy low boiling inert non-polar solvent is employed.

7. A process in accordance with claim 1, wherein the hydrogen bromide formed during the reaction is continuously removed from the reaction solution by distillation together with solvent vapors.

8. A process in accordance with claim 6, wherein the treatment of the dilute solution of said olefinic compound under treatment with bromine is carried out at a moderate temperature not higher than that of the boiling point of the relatively low boiling non-polar solvent.

9. A process in accordance with claim 1, wherein the bromine is added gradually to the dilute solution of said olefinic compound under treatment and only in such a degree that side-reactions by the presence of excess bromine in the solution are avoided.

10. A process in accordance with claim 1, wherein the dilute solution of said olefinic compound to be reacted upon by the bromine contains about 1 to 2% of said olefinic compound under treatment.

11. A process in accordance with claim 1, wherein the said dilute solution is stirred during the treatment with bromine.

12. A process for the bromination of an ester of an ethylenically unsaturated alcohol selected from the group consisting of acyclic and monocyclic alcohols, said bromination to be effected in α-position to the double bond, comprising the steps of dissolving said ester in a relatively low boiling inert non-polar solvent to form a solution having a concentration of not more than about 2%, maintaining said solution at the boiling point of said solvent, gradually introducing bromine into said solution while irradiating the solution with light, simultaneously withdrawing hydrobromic acid as formed in the course of the reaction, and separating the ester of said alcohol brominated in α-position to the double bond.

13. The process which comprises forming a solution containing not more than about 2% of crotonyl acetate dissolved in a solvent selected from the group consisting of carbon tetrachloride and carbon disulfide, boiling said solution, gradually introducing bromine into said solution while irradiating the solution with light, simultaneously withdrawing hydrobromic acid as formed in the course of the reaction, and separating from the solution crotonyl acetate brominated in α-position to the double bond.

References Cited in the file of this patent

UNITED STATES PATENTS

| | | |
|---|---|---|
| 2,531,688 | Jones et al. | Nov. 28, 1950 |
| 2,554,533 | Ladd | May 29, 1951 |
| 2,585,998 | Buisman | Feb. 19, 1952 |
| 2,590,637 | Miescher et al. | Mar. 25, 1952 |
| 2,633,451 | Schaltegger | Mar. 31, 1953 |
| 2,647,867 | Schaltegger | Aug. 4, 1953 |